United States Patent
Han

(10) Patent No.: US 10,012,972 B2
(45) Date of Patent: Jul. 3, 2018

(54) PLC SYSTEM PROVIDING A WEB BASED SERVICE

(71) Applicant: LSIS CO., LTD., Anyang-si, Gyeonggi-do (KR)

(72) Inventor: Seung Shin Han, Cheonan-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 307 days.

(21) Appl. No.: 14/928,837

(22) Filed: Oct. 30, 2015

(65) Prior Publication Data
US 2016/0124414 A1 May 5, 2016

(30) Foreign Application Priority Data
Oct. 30, 2014 (KR) .................. 10-2014-0148901

(51) Int. Cl.
*G05B 19/05* (2006.01)
*H04L 29/08* (2006.01)

(52) U.S. Cl.
CPC ........... *G05B 19/05* (2013.01); *G05B 19/056* (2013.01); *H04L 67/02* (2013.01); *H04L 67/06* (2013.01); *H04L 67/104* (2013.01); *G05B 2219/1144* (2013.01); *G05B 2219/15038* (2013.01); *G05B 2219/32136* (2013.01)

(58) Field of Classification Search
CPC .................. G05B 19/05; G05B 19/056; G05B 2219/1144; G05B 2219/15038; G05B 2219/32136; H04L 67/02; H04L 67/06; H04L 67/104
See application file for complete search history.

(56) References Cited

U.S. PATENT DOCUMENTS

| 5,392,444 | A | | 2/1995 | Inoue | |
|---|---|---|---|---|---|
| 6,151,625 | A | * | 11/2000 | Swales | ................... G05B 19/05 709/218 |
| 6,282,454 | B1 | * | 8/2001 | Papadopoulos | ........ G05B 19/05 700/67 |

(Continued)

FOREIGN PATENT DOCUMENTS

| JP | S63310004 | 12/1988 |
|---|---|---|
| JP | PH1185220 | 3/1999 |

(Continued)

OTHER PUBLICATIONS

Korean Intellectual Property Office Application Serial No. 10-2014-0148901, Office Action dated Nov. 12, 2015, 3 pages.

(Continued)

*Primary Examiner* — M. N. Von Buhr
(74) *Attorney, Agent, or Firm* — K&L Gates LLP

(57) ABSTRACT

A programmable logic controller (PLC) system is provided. The programmable logic controller (PLC) system includes a storage unit storing a user program; a main control unit performing a scan operation based on the user program, measuring a scan time required for the scan time, and determining whether there is a need to process a web based service; and a web based service control unit processing the service data based on the scan time service request details, and service data that are transmitted from the main control unit, according to a result of the determination on whether there is a need to process the web based service.

11 Claims, 5 Drawing Sheets

(56) References Cited

U.S. PATENT DOCUMENTS

| | | | | |
|---|---|---|---|---|
| 6,640,140 | B1 | 10/2003 | Lindner et al. | |
| 7,225,037 | B2* | 5/2007 | Shani | G05B 19/056 700/18 |
| 8,028,099 | B2* | 9/2011 | Batke | G05B 19/054 709/230 |
| 8,041,840 | B2* | 10/2011 | Batke | G05B 19/05 700/83 |
| 9,231,657 | B2* | 1/2016 | Vedantham | H04B 3/542 |
| 9,503,158 | B2* | 11/2016 | Vedantham | H04B 3/542 |
| 9,778,652 | B2* | 10/2017 | Nausley | G05B 23/02 |
| 9,921,564 | B2* | 3/2018 | Yoshikawa | G05B 19/05 |
| 2003/0204560 | A1 | 10/2003 | Chen et al. | |
| 2005/0085928 | A1* | 4/2005 | Shani | G05B 19/056 700/18 |
| 2009/0210540 | A1* | 8/2009 | Schuierer | H04L 67/16 709/228 |
| 2010/0094981 | A1* | 4/2010 | Cordray | G06F 15/173 709/222 |
| 2011/0077749 | A1* | 3/2011 | Shang | G05B 19/0421 700/5 |
| 2013/0182719 | A1* | 7/2013 | Vedantham | H04B 3/542 370/474 |
| 2016/0091882 | A1* | 3/2016 | Ludwig | G05B 19/056 700/86 |
| 2017/0006135 | A1* | 1/2017 | Siebel | H04L 67/02 |

FOREIGN PATENT DOCUMENTS

| | | |
|---|---|---|
| JP | 2004511845 | 4/2004 |
| JP | 2005004476 | 1/2005 |
| JP | 2005293312 | 10/2005 |
| JP | 2006031404 | 2/2006 |
| JP | 2013-050978 | 3/2013 |
| JP | 2014002584 | 1/2014 |
| KR | 10-2002-0084140 | 11/2002 |
| KR | 10-2013-0137478 | 12/2013 |

OTHER PUBLICATIONS

Mathes, "Time-Constrained Web Services for Industrial Automation", PhD Dissertation, Jul. 9, 2009, 201 pages.

Stoidner, et al., "Sequence-Controlled Web Services for Programmable Logic Controllers", 13th IFAC Symposium on Information Control Problems in Manufacturing, Jun. 3, 2009, 6 pages.

Cachapa D et al., "An Approach for Integrating Real and Virtual Production Automation Devices Applying the Service-oriented Architecture Paradigm", Proceedings. IEEE Conference on Emerging Technologies and Factory Automation, Sep. 25, 2007, 314 pages.

European Patent Office Application Serial No. 15189881.4, European Search Report dated Dec. 22, 2015, 7 pages.

Japan Patent Office Application Serial No. 2015-211814, Office Action dated Aug. 16, 2016, 2 pages.

\* cited by examiner

PLC SYSTEM PROVIDING A WEB BASED SERVICE

CROSS-REFERENCE TO RELATED TO APPLICATIONS

Pursuant to 35 U.S.C. § 119(a), this application claims the benefit of earlier filing date and right of priority to Korean Patent Application No. 10-2014-0148901, filed on Oct. 30, 2014, the contents of which are all hereby incorporated by reference herein in its entirety.

BACKGROUND

The present disclosure relates to a PLC system and more particularly, to a PLC system that may sufficiently control the industrial site and efficiently perform a web based service.

In recent, industrial equipment, such as a programmable logic controller (PLC) is increasing the support of a web based service, such as a hypertext transfer protocol (HTTP), file transfer protocol (FTP), simple network time protocol (SNTP), simple mail transfer protocol (SMTP), etc. service.

That is, the PLC checks the state of control equipment at a remote place through web server support using the HTTP and receives data on equipment using the FTP. Also, the PLC uses the SNTP for time synchronization through a network and uses an SMTP service to transmit, what the control equipment experiences, to a user through an e-mail.

FIG. 1 is a protocol architecture diagram for a general web based service, a Transmission Control Protocol layer (TCP) 11 and an Internet Protocol (IP) layer 12 performs a function of transmitting data to a destination, and an application layer 13 is located on the TCP/IP layers 11 and 12 and functions as an interface between a system and a user to provide a service that the user desires.

A service configuring the application layer 13 includes SMTP, FTP, SNTP, data communication, etc. and data transmitted from the TCP/IP layers 11 and 12 to the application layer 13 is analyzed and processed in an application layer service suitable for a data characteristic.

In this case, the data communication service transmits and receives information on industrial equipment or control data, and the web based service controls a system along with the data communication service or provides data processed as desired by a user.

FIG. 2 is a flowchart of the operation of a PLC system conforming to typical scan synchronization batch processing, which is a method in which input data is first processed, data is processed according to a user-defined control program and then a processed result is applied to an output.

In this case, when the PLC system starts an operation, a scan operation is performed in step S21. That is, when input image region refresh is performed in step S21-1, an operation is performed by using a scan program in step S21-3, and the operation is completed, output image region refresh is performed in step S21-5.

After the scan operation in step S21, the PLC system determines whether web based service processing is required in step S23, and when the web based service processing is not required, the scan operation is again performed in step S21, and when the web based service processing is required, a web service is performed in step S25 and then the scan operation is performed in step S21.

Thus, the web based service in the PLC system conforming to the typical scan synchronization batching processing requires an operation separated from the scan operation.

Since system control at the industrial site highly considers quick data processing and response, a scan time works as an importance criterion that determines the quality of equipment.

The web based service, such as an HTTP, FTP, SNTP, SMTP, etc. service does not cause a system a load before a user requests a service, but as soon as an operation is performed, processing a lot of data is required.

Processing a lot of data for the operation of the web based service works as a reason for an increase in scan time. As a result, it affects the control process of industrial equipment, so it is possible to cause the malfunction of a system.

On the contrary, when the data processing of the web based service is restricted in order to minimize an impact that the web based service has on the control process of the industrial equipment; the web based service may not smoothly be performed.

SUMMARY

Embodiments provide a PLC system that may sufficiently control the industrial site and efficiently perform a web based service.

In one embodiment, a programmable logic controller (PLC) system includes a storage unit storing a user program; a main control unit performing a scan operation based on the user program, measuring a scan time required for the scan time, and determining whether there is a need to process a web based service; and a web based service control unit processing the service data based on the scan time service request details, and service data that are transmitted from the main control unit, according to a result of the determination on whether there is a need to process the web based service.

According to an embodiment, it is possible to measure a scan time according to a scan operation and variably determine an amount of a web based service processed according to the scan time to process a service.

Thus, a PLC system may sufficiently control the industrial site and efficiently perform the web based service.

Also, since services are processed according to a priority when there is a need to process a plurality of web based services, it is possible to efficiently process the web based service and it is possible to enhance the quality of the web based service.

The details of one or more embodiments are set forth in the accompanying drawings and the description below. Other features will be apparent from the description and drawings, and from the claims.

DETAILED DESCRIPTION OF THE EMBODIMENTS

Figure 1:
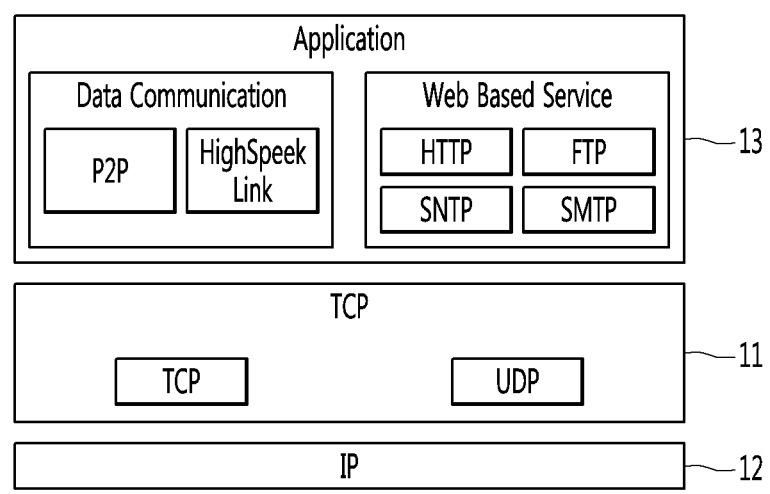
FIG. 1 is a protocol architecture diagram of a general web based service.
Figure 2:
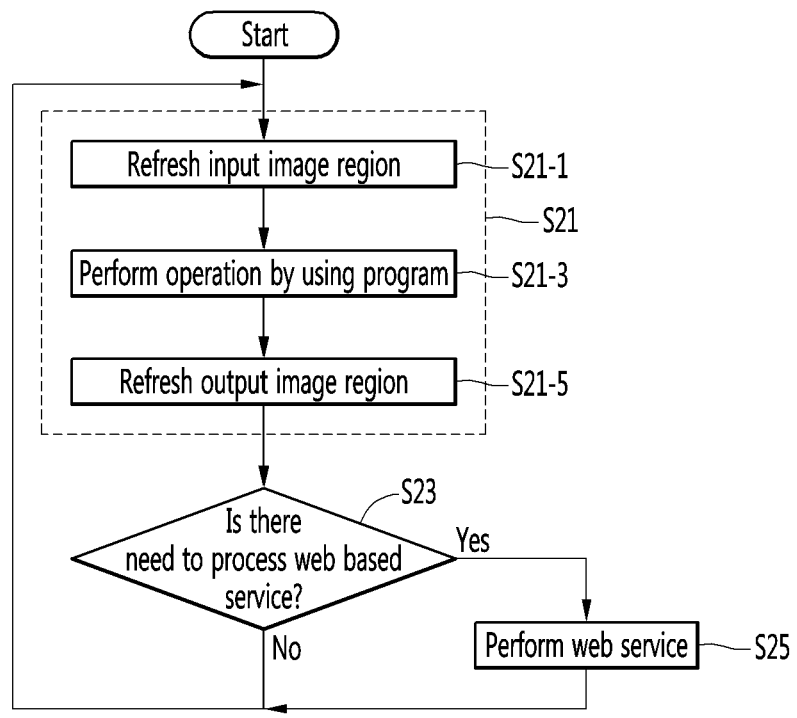
FIG. 2 is a flowchart of the operation of a PLC system conforming to typical scan synchronization batch processing.

The terms or words used in the detailed description and claims should not be imitatively construed as typical meanings or meanings indicated in dictionaries but should be construed as meanings and concepts matching the technical spirit of the inventive concept based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

In the following, a PLC system according to an embodiment and a web based service processing method are described in detail with reference to the accompanying drawings.

Figure 3:
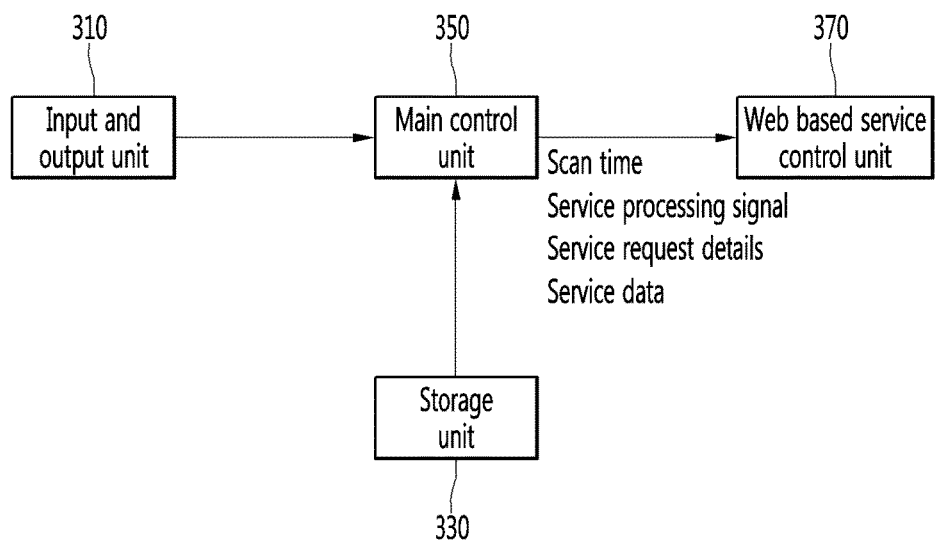
FIG. 3 is a block diagram of a PLC system according to an embodiment.

FIG. 3 is a block diagram of a PLC system according to an embodiment.

Referring to FIG. 3, a PLC system 300 according to an embodiment may include an input and output unit 310, a storage unit 320, a main control unit 350, and a web based service control unit 370. Other components may be further included or some components may be omitted.

The input and output unit 310 is configured to transmit and receive data to and from an external device connected to the PLC system 300.

The storage unit 330 may store various programs and various pieces of data required for the operation of the PLC system. For example, the storage unit 330 stores an operating system (OS), a user program, input and output data and a result of an operation according to a program.

The main control unit 350 may control the entire PLC system 300. The main control unit 350 performs an operation (scan operation) according to a program. In this case, the main control unit 350 measures a time (scan time) taken to perform the scan operation. The scan time measured by the main control unit 350 may be transmitted to the web based service control unit 370.

In this example, the scan operation may include an input image region refresh operation, an operation using a scan program, and an output image region refresh operation.

The input image region refresh operation may be defined as reading the contact state value of an input module of the PLC system before the performing of the scan program, and storing the read value in an input image region. That is, the input image region refresh operation may be an operation of reading data from an external device.

The output image region refresh operation may be defined as storing a result of the execution of the scan program in an output image region. The result of the execution stored in the output image region may be output to an output module.

The main control unit 350 may transmit to the web based control unit 370 the scan time measured after the completion of the scan operation and also determine whether there is a need to process a web based service.

When as a result of the determination on whether there is a need to process a web based service, it is determined that there is no need to process a web based service, the main control unit 350 may measure the scan time, again performing the scan operation.

On the contrary, when as a result of the determination on whether there is a need to process a web based service, it is determined that there is a need to process a web based service, the main control unit 350 may transmit a signal for processing the web based service.

As an example, the determination on whether there is a need to process a web based service may be performed based on whether service request is input from the outside.

In this case, when it is determined that a request for a web based service has been input, the main control unit 350 may transmit, to the web based service control unit 360, service request details and service data along with a service processing signal.

The web based service control unit 370 may process and provide service data according to the service request details when the service processing signal, the service request details, and the service data are received from the main control unit 350. In this case, the web based service control unit 370 may adjust an amount of service data with reference to the scan time provided from the main control unit 350.

The data processing method of the web based service control unit 370 according to the scan time may be differently set. As an example, it is possible to set an amount of data processed according to the scan time and process service data based on the scan time and the amount of data processed that has been set.

As another example, it is possible to divide the scan time based on a certain range, set an amount of data processed according to the certain range, and it is possible to determine service data based on the determination on to which range the scan time belongs and an amount of data processed in the range to which the determined scan time belongs.

As described above, the data processing method of the web based service according to the scan time is provided to help a reader understand the embodiment and is not limited to the above.

However, the web based service control unit 370 may process more service data when the scan time is short in comparison to when the scan time is long.

In the following, the configuration and operation of the web based service control unit according to an embodiment is described in detail with reference to FIG. 4.

Figure 4:
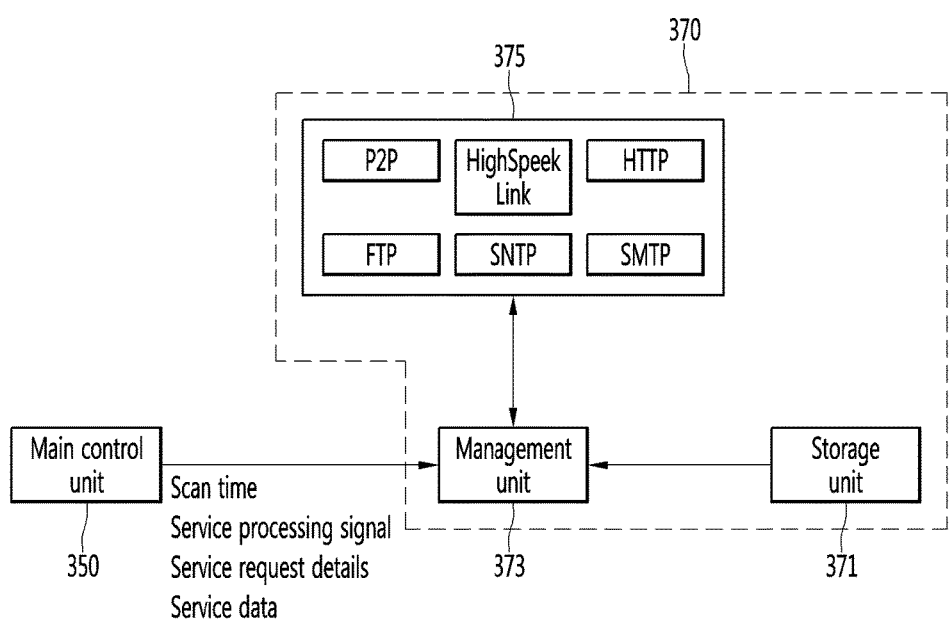
FIG. 4 is a block diagram of a web based service control unit according to an embodiment.

FIG. 4 is a block diagram of a web based service control unit according to an embodiment.

Referring to FIG. 4, a web based service control unit 370 according to an embodiment may include a storage unit 371, a management unit 373, and a processing unit 375. The configuration of the web based service control unit 370 is not limited thereto and depending on an embodiment, other components may be added or some components may be excluded.

The storage unit 371 may store a priority according to a service and an amount of data processed according to a scan time.

In this case, the priority according to the service may include a priority between a control data transmission and reception service and a user convenience service, a priority between services included in the control data transmission and reception service, and a priority between services included in the user convenience service.

In this example, the control data transmission service may include a peer to peer (P2P) based service and a high speed link based service, and the user convenience service may include a hyper text transfer protocol (HTTP) based service, a file transfer protocol (FTP) based service, an simple network time protocol (SNTP) based service, and a simple main transfer protocol (SMTP) based service.

The management unit 173 may receive a service processing signal, service request details, and service data that are transmitted from the main control unit 350, and transmit, to the processing unit 375, a certain amount of service data according to an amount of data processed according to a scan time stored in the storage unit 371.

In this case, the management unit 373 may determine whether service details are included in the service request details transmitted from the main control unit 350.

When it is determined that the service details are included in the service request details, the management unit 373 may transmit service data to the processing unit 375 to process a service detail having a top priority among the service details with reference to the priority according to the service stored in the storage unit 371.

The processing unit 375 may process service data transmitted from the management unit 373 according to a service detail and transmit a result of processing to the management unit 373.

In this case, the processing unit 375 may process the service data to be suitable for the service detail, and the service processed and provided by the processing unit 375 includes the control data transmission and reception service, such as a P2P, high speed link, etc. service or the user convenience service, such as an HTTP, FTP, SNTP, SMTP, etc. service.

To this end, the processing unit 375 may include a plurality of function blocks for the processing of the service detail and each function block may be implemented as an algorithm for processing the service detail.

The configuration and function of the PLC system according to an embodiment has been described above. In the following, a web based service processing method of a PLC system is described with reference to the accompanying drawings.

Figure 5:
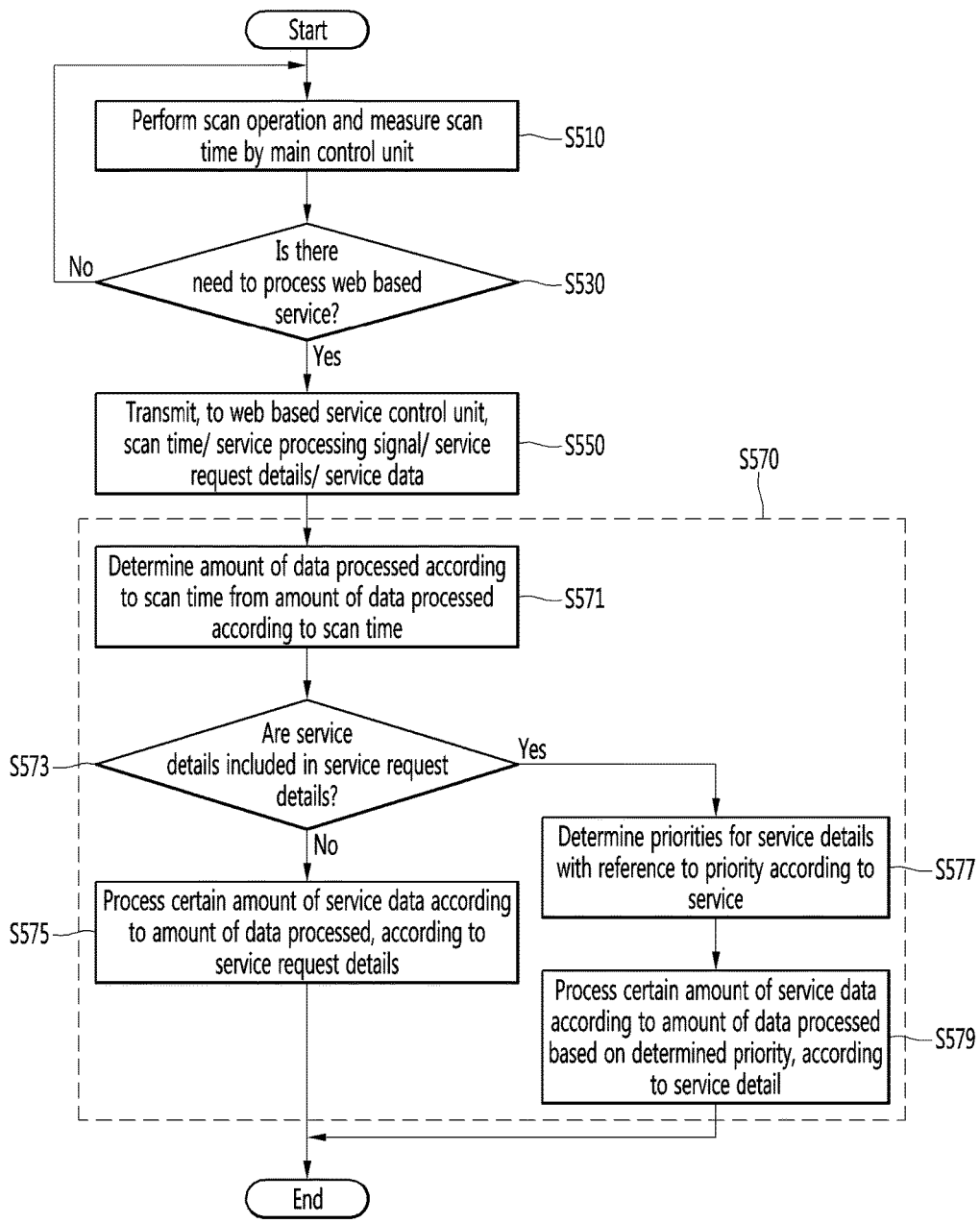
FIG. 5 is a flowchart of the process of processing a web based service according to an embodiment.

FIG. 5 is a flowchart of the process of processing a web based service according to an embodiment.

Referring to FIG. 5, a main control unit 359 may measure a scan time taken for a scan operation, performing the scan operation in step S510.

In this case, the scan time is a time taken during one scan, which includes an input image region refresh operation, an operation using a scan program, and an output image region refresh operation.

When the scan is completed, the main control unit 350 may determine whether there is a need to process a web based service, in step S530.

The main control unit 350 may perform the scan operation when it is determined that there is no need to process the web based service, in step S510.

On the contrary, when it is determined that there is a need to process the web based service, the main control unit 350 may transmit, to the web based service control unit 370, the scan time, a service processing signal, service request details and service data, in step S550.

In this case, the determination on whether there is a need to process the web based service may be performed based on whether a service request is input from the outside. That is, the main control unit 350 may determine that there is a need to process the web based service when the service request is input from the outside, and may determine that there is no need to process the web based service when the service input is not input from the outside.

The web based service control unit 370 may process a certain amount of service data according to an amount of data processed according to a scan time, according to request details in step S570.

The operation of processing, the certain amount of service data according to the amount of data processed according to a scan time, according to the request details at the web based service control unit 370 may be performed as follows.

The web based service control unit 370 may determine an amount of data processed according to a transmitted scan time with reference to a pre-stored amount of data processed according to a scan time and a transmitted scan time, in step S571.

The web based service control unit 370 may determine whether service details are included in the received service request details in step S573. When the service details are not included (when only one service is requested), it is possible to process a certain amount of service data according to the amount of data processed that has been determined, based on the service request details, in step S575.

On the contrary, when it is determined that the service details are included in the service request details, the web based service control unit 370 may determine a priority based on the service details with reference to a priority according to a service pre-stored in the storage unit 371, in step S577.

In this case, it is possible to determine a priority for a service detail by determining whether the service details are included in a control data transmission and reception service or in a user convenience service, to which service the service details belong among control data transmission and reception services or to which service the service details belong among user convenience services.

When the priority for the service detail is determined, the web based service control unit 370 may process a certain amount of service data according to an amount of data processed that has been predetermined, according to the service request details based on the determined priority, in step S579.

According to an embodiment, it is possible to measure a scan time required for a scan operation and determine an amount of a web based service processed according to the scan time to process a service. Thus, a PLC system may efficiently perform the web based service, sufficiently controlling the industrial site.

Also, since services are processed according to a priority when there is a need to process a plurality of web based services, it is possible to efficiently process the web based service and it is possible to enhance the quality of the web based service.

Exemplary embodiments are mainly described above. However, they are only examples and do not limit the inventive concept. A person skilled in the art may appreciate that many variations and applications not presented above may be implemented without departing from the essential characteristic of embodiments. For example, each component specifically represented in embodiments may vary. In addition, it should be construed that differences related to such a variation and such an application are included in the scope of the present disclosure defined in the following claims.

What is claimed is:

1. A programmable logic controller (PLC) system comprising:
a first storage unit storing a user program;
a main control unit performing a scan operation based on the user program, measuring a scan time required for the scan operation, and transmitting the measured scan time and service data if a web based service request is received; and
a web based service control unit receiving the measured scan time and the service data, determining a priority of the service data, and processing the service data based on the scan time and the priority,
wherein the web based service control unit determines an amount of data processed according to the scan time and processes the service data based on the scan time and the determined amount of data processed.

2. The programmable logic controller (PLC) system according to claim 1, wherein the web based service control unit divides the scan time based on a pre-set range and determines the amount of data processed according to the pre-set range.

3. The programmable logic controller (PLC) system according to claim 2, wherein the web based service control unit determines a range which the scan time belongs and processes the service data based on the determined range.

4. The programmable logic controller (PLC) system according to claim 1, wherein the main control unit determines whether the web based service request is received after completion of the scan operation.

5. The programmable logic controller (PLC) system according to claim 1, wherein the scan time is in inverse proportion to the determined amount of data processed.

6. The programmable logic controller (PLC) system according to claim 1, wherein the web based service control unit comprises:
 a second storage unit storing throughput data;
 a management unit determining the amount of data processed according to the scan time based on the throughput data, and outputting a certain amount of service data according to the determined amount of data processed; and
 a processing unit receiving service data from the management unit, processing the received data according to service request details, and transmitting a result of processing to the management unit.

7. The programmable logic controller (PLC) system according to claim 6, wherein the web based service processed by the processing unit comprises at least one of a peer to peer (P2P) based service, a high speed link based service, a hyper text transfer protocol (HTTP) based service, a file transfer protocol (FTP) based service, a simple network time protocol (SNTP) based service, and a simple mail transfer protocol (SMTP) based service.

8. The programmable logic controller (PLC) system according to claim 6, wherein the second storage unit further stores the priority according to a service.

9. The programmable logic controller (PLC) system according to claim 1, wherein the priority comprises at least one of a priority between a control data transmission and reception service and a user convenience service, a priority between services included in the control data transmission and reception service, and a priority between services included in the user convenience service.

10. The programmable logic controller (PLC) system according to claim 9, wherein the control data transmission and reception service comprises a P2P based service and a high speed link based service.

11. The programmable logic controller (PLC) system according to claim 9, wherein the user convenience service comprises an HTTP based service, an FTP based service, an SNTP based service, and an SMTP based service.

* * * * *